United States Patent
Wang et al.

(10) Patent No.: US 9,841,779 B2
(45) Date of Patent: Dec. 12, 2017

(54) VARIABLE REFERENCE SIGNAL GENERATOR USED WITH SWITCHING MODE POWER SUPPLY AND THE METHOD THEREOF

(71) Applicant: Monolithic Power Systems, Inc., San Jose, CA (US)

(72) Inventors: Yiwei Wang, Chengdu (CN); Yike Li, Chengdu (CN)

(73) Assignee: Monolithic Power Systems, Inc., San Jose, CA (US)

(*) Notice: Subject to any disclaimer, the term of this patent is extended or adjusted under 35 U.S.C. 154(b) by 31 days.

(21) Appl. No.: 14/937,853

(22) Filed: Nov. 10, 2015

(65) Prior Publication Data

US 2016/0147248 A1    May 26, 2016

(30) Foreign Application Priority Data

Nov. 21, 2014 (CN) .......................... 2014 1 0674864

(51) Int. Cl.
*G05F 3/26* (2006.01)
*H02M 7/217* (2006.01)

(52) U.S. Cl.
CPC .............. *G05F 3/262* (2013.01); *G05F 3/26* (2013.01); *H02M 7/217* (2013.01)

(58) Field of Classification Search
CPC .................................. G05F 3/26; G05F 3/262
USPC ......................................................... 323/313
See application file for complete search history.

(56) References Cited

U.S. PATENT DOCUMENTS

| | | | |
|---|---|---|---|
| 7,564,225 B2 | 7/2009 | Moraveji et al. | |
| 7,872,455 B2 | 1/2011 | Moraveji et al. | |
| 8,928,305 B2 | 1/2015 | Ueunten et al. | |
| 2009/0153123 A1* | 6/2009 | Kraft | H02M 1/32 323/285 |
| 2010/0308654 A1* | 12/2010 | Chen | H02M 3/1584 307/31 |
| 2011/0141784 A1* | 6/2011 | Lee | H02M 7/217 363/127 |
| 2011/0199062 A1* | 8/2011 | Singnurkar | H02M 3/1582 323/282 |
| 2012/0217894 A1* | 8/2012 | Chang | H05B 37/0263 315/265 |

* cited by examiner

*Primary Examiner* — Jue Zhang
*Assistant Examiner* — Trinh Dang
(74) *Attorney, Agent, or Firm* — Perkins Coie LLP

(57) ABSTRACT

A reference signal generator used with a switching mode power supply which converts an input voltage to an output voltage. The reference signal generator provides a reference signal consisting of a constant voltage signal and a variable voltage signal which is varying according to a duty cycle of the switching mode power supply during a startup period of the switching mode power supply and is varying according to a ratio of the input voltage at an end of the startup period to the input voltage of real time after the startup period.

21 Claims, 7 Drawing Sheets

VARIABLE REFERENCE SIGNAL GENERATOR USED WITH SWITCHING MODE POWER SUPPLY AND THE METHOD THEREOF

CROSS-REFERENCE TO RELATED APPLICATIONS

This application claims priority to and the benefit of Chinese Patent Application No. 201410674864.1, filed Nov. 21, 2014, which is incorporated herein by reference in its entirety.

FIELD

The present invention relates generally to electronic circuits, and more particularly but not exclusively to reference signal generator and the method thereof.

BACKGROUND

In a switching mode power supply with peak current control, a current flowing through an inductor is compared to a reference signal. The comparison result is used to control the ON and OFF of power switches of the switching mode power supply so as to control the power transfer. In order to achieve a steady system, an artificial ramp is added to the current flowing through the inductor before it is compared to the reference signal. But the artificial ramp will cause error between the peak of the current flowing through the inductor and the reference signal. Traditionally, the artificial ramp is varying with duty cycle of the switching mode power supply. As a result, the real peak of the current flowing through the inductor varies with the duty cycle, causing an output current of the switching mode power supply deviating from a preset value.

The present invention pertains to provide a reference signal generator which generates a reference signal adjusted by the input voltage and the duty cycle of the switching mode power supply, so as to eliminate the error caused by the artificial ramp.

SUMMARY

It is an object of the present invention to provide a reference signal generator used with a switching mode power supply and the method thereof.

In accomplishing the above and other objects, there has been provided, in accordance with an embodiment of the present invention, a reference signal generator used with a switching mode power supply, wherein the switching mode power supply converts an input voltage to an output voltage, comprising: a constant voltage generator configured to provide a constant voltage signal; a voltage convert circuit having an input terminal configured to receive the input voltage, a first output terminal configured to provide a startup voltage converted digital signal indicative of the input voltage during a startup period of the switching mode power supply, and a second output terminal configured to provide a real time voltage converted digital signal indicative of the real time input voltage; a duty cycle convert circuit, having an input terminal configured to receive a duty cycle signal indicative of a duty cycle of the switching mode power supply, and an output terminal configured to provide a duty cycle converted digital signal indicative of the duty cycle of the switching mode power supply; and a variable voltage generator having a first input terminal coupled to the first output terminal of the voltage convert circuit to receive the startup voltage converted digital signal, a second input terminal coupled to the second output terminal of the voltage convert circuit to receive the real time voltage converted digital signal, a third input terminal coupled to the output terminal of the duty cycle convert circuit to receive the duty cycle converted digital signal, and an output terminal configured to provide a variable voltage signal based on the startup voltage converted digital signal, the real time voltage converted digital signal and the duty cycle converted digital signal; wherein a reference signal is generated based on a sum of the constant voltage signal and the variable voltage signal.

There has been provided, in accordance with an embodiment of the present disclosure, a switching mode power supply comprising: a switching circuit including an inductor, wherein the switching circuit is configured to convert an input voltage to an output voltage; a current sense circuit having an input terminal and an output terminal, wherein the input terminal is coupled to the switching circuit to sense a current flowing through the inductor of the switching circuit, and based on the current flowing through the inductor, the current sense circuit generates a current sense signal at the output terminal; a slope compensation circuit having an input terminal and an output terminal, wherein the input terminal is coupled to the current sense circuit to receive the current sense signal, and the slope compensation circuit performs a sum operation on a slope compensation signal and the current sense signal to generate a compensated current sense signal at the output terminal; a reference signal generator configured to generate a reference signal, wherein the reference signal consists a constant voltage signal and a variable voltage signal which is varying according to a duty cycle of the switching mode power supply during a startup period and is varying according to the input voltage after the startup period; a comparison circuit having a first input terminal, a second input terminal and an output terminal, wherein the first input terminal is coupled to the slope compensation circuit to receive the compensated current sense signal, the second input terminal is coupled to the reference signal generator to receive the reference signal, and based on the compensated current sense signal and the reference signal, the comparison circuit generates a comparison result at the output terminal; and a mode control circuit having an input terminal and an output terminal, wherein the input terminal is coupled to the comparison circuit to receive the comparison result, and based on the comparison result, the mode control circuit provides a mode control signal at the output terminal; wherein the switching circuit receives the mode control signal, and works under different modes according to the mode control signal.

There has been provided, in accordance with an embodiment of the present disclosure, a switching mode power supply comprising: a switching circuit including an inductor, wherein the switching circuit is configured to convert an input voltage to an output voltage; a current sense circuit having an input terminal and an output terminal, wherein the input terminal is coupled to the switching circuit to sense a current flowing through the inductor of the switching circuit, and based on the current flowing through the inductor, the current sense circuit generates a current sense signal at the output terminal; a slope compensation circuit having an input terminal and an output terminal, wherein the input terminal is coupled to the current sense circuit to receive the current sense signal, and the slope compensation circuit performs a sum operation on a slope compensation signal and the current sense signal to generate a compensated current sense signal at the output terminal; a reference signal generator configured to generate a reference signal, wherein the reference signal consists a constant voltage signal and a variable voltage signal which is varying according to a duty cycle of the switching mode power supply during a startup period of the switching mode power supply and is varying according to the input voltage after the startup period; a comparison circuit having a first input terminal, a second input terminal and an output terminal, wherein the first input terminal is coupled to the slope compensation circuit to receive the compensated current sense signal, the second input terminal is coupled to the reference signal generator to receive the reference signal, and based on the compensated current sense signal and the reference signal, the comparison circuit generates a comparison result at the output terminal; and a logic control circuit having an input terminal and an output terminal, wherein the input terminal is coupled to the comparison circuit to receive the comparison result, and based on the comparison result, the logic control circuit provides a control signal at the output terminal; wherein the switching circuit receives the control signal provided by the logic control circuit, and works under the control of the control signal.

There has been provided, in accordance with an embodiment of the present disclosure, A method of generating a reference signal used with a switching mode power supply, comprising: converting an input voltage of the switching mode power supply to a real time voltage converted digital signal; generating a startup voltage converted digital signal based on the real time voltage converted digital signal, wherein the startup voltage converted digital signal remains the value at an end of a startup period unchanged after the startup period of the switching mode power supply; converting a duty cycle signal to a duty cycle converted digital signal; and generating the reference signal based on the real time voltage converted digital signal, the startup voltage converted digital signal and the duty cycle converted digital signal; wherein during the startup period of the switching mode power supply, the reference signal is directly proportional to the duty cycle of the switching mode power supply, and after the startup period of the switching mode power supply, the reference signal is directly proportional to the ratio of the input voltage at the end of the startup period to the input voltage of real time.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
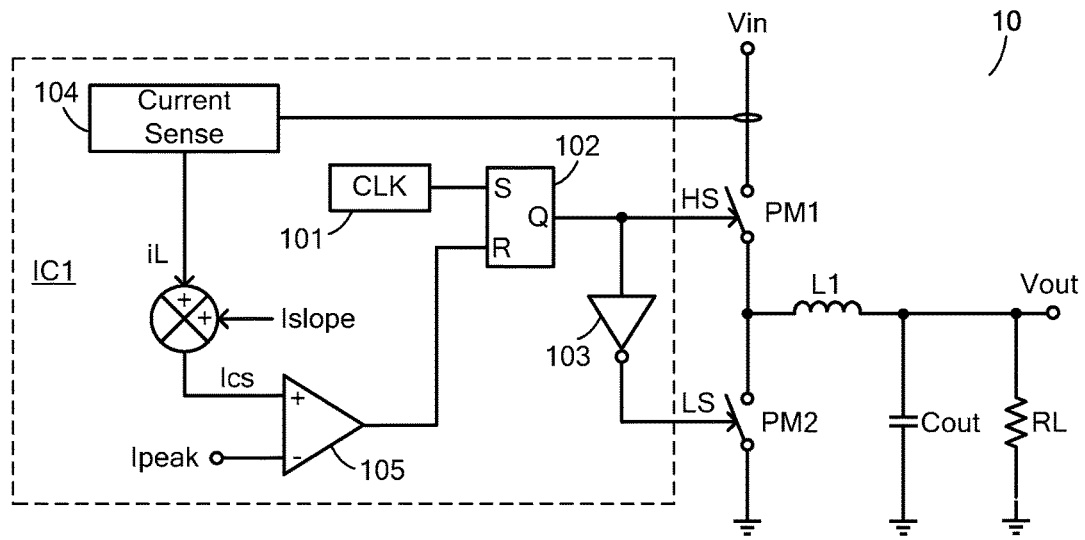
FIG. 1 schematically shows a prior art switching mode power supply 10.

FIG. 1 schematically shows a prior art switching mode power supply 10. The switching mode power supply 10 converts an input voltage Vin to an output voltage Vout. As shown in FIG. 1, the switching mode power supply 10 comprises a high-side power switch PM1, a low-side power switch PM2, an inductor L1, an output capacitor Cout and a control circuit IC1. In every switching cycle, a CLK circuit 101 sets a RS flip-flop 102 to generate a high-side control signal HS to turn ON the high-side power switch PM1. Meanwhile, the high-side control signal HS is inverted by an inverter 103 to generate a low-side control signal LS to turn OFF the low-side power switch PM2. Persons of ordinary skill in the art should know that the inverter 103 could be omitted when the high-side power switch PM1 and the low-side power switch PM2 are turned ON by signals with opposite phases. As a result, a current from the input voltage Vin flows through the inductor L1 to charge the output capacitor Cout, so as to build the output voltage Vout. A current sense circuit 104 senses the current flowing through the inductor L1 to generate a current sense signal iL. Then a slope compensation signal Islope is added to the current sense signal iL. A sum Ics of the slope compensation signal Islope and the current sense signal iL is compared to a peak current signal Ipeak by a comparator 105. The comparison result resets the RS flip-flop 102 to generate the high-side signal HS to turn OFF the high-side power switch PM1. Meanwhile, the low-side control signal LS turns OFF the low-side power switch PM2. The ratio of ON time of the high-side power switch PM1 in a switching cycle to the time period of the switching cycle of the switching mode power supply 10 is defined as a duty cycle D.

Figure 2:
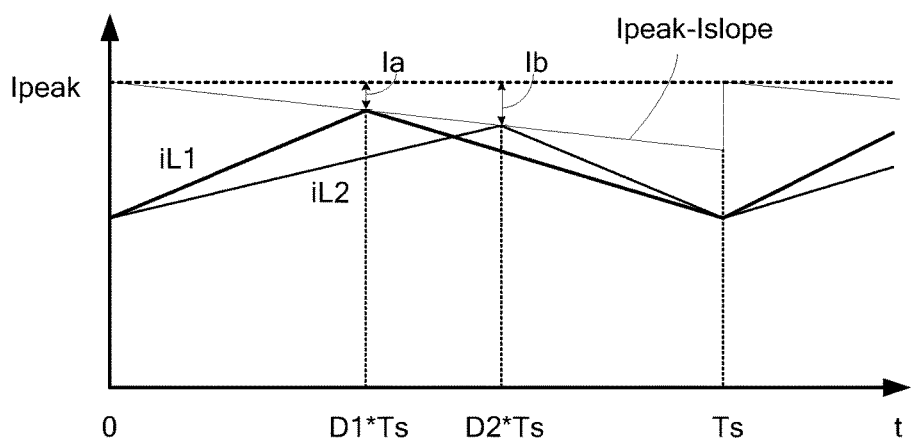
FIG. 2 shows waveforms of the current sense signals and the peak current signal Ipeak, wherein iL1 represents the current sense signal when the duty cycle is D1 and iL2 represents the current sense signal when the duty cycle is D2.

FIG. 2 shows waveforms of the current sense signals and the peak current signal Ipeak, wherein iL1 represents the current sense signal when the duty cycle is D1 and iL2 represents the current sense signal when the duty cycle is D2. As shown in FIG. 2, the slope compensation signal Islope causes an error between the real peak of the current sense signal and the peak current signal Ipeak. The error is Ia when the duty cycle is D1 and is Ib when the duty cycle is D2, and Ib>Ia because D2>D1. Obviously, the error between the real peak of the current sense signal and the peak current signal Ipeak is actually equal to value of the slope compensation signal Islope. Because the slope compensation signal Islope is varying with the duty cycle of the switching mode power supply, the real peak of the current sense signal is varying with the duty cycle of the switching mode power supply too if the peak current signal Ipeak is constant. The variety of the real peak of the current sense signal will cause the output current fluctuation.

Figure 3:
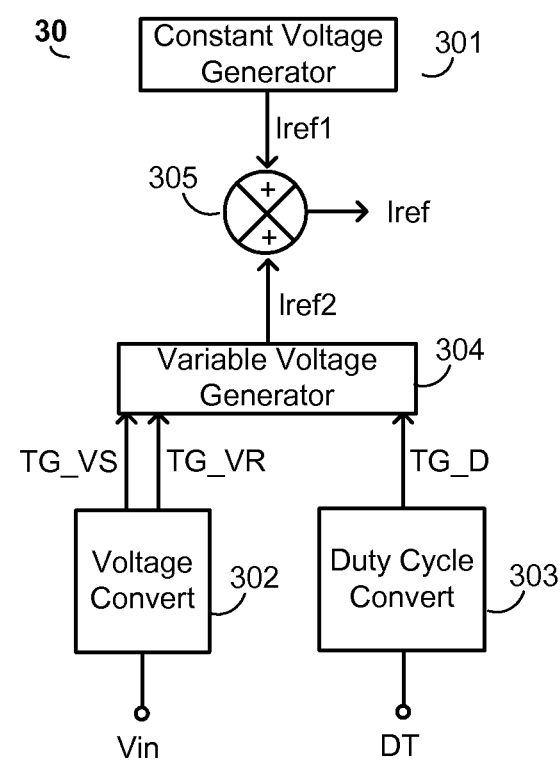
FIG. 3 schematically shows a reference signal generator 30 in accordance with an embodiment of the present invention.

FIG. 3 schematically shows a reference signal generator 30 in accordance with an embodiment of the present invention. The reference signal generator 30 comprises: a constant voltage generator 301 configured to provide a constant voltage signal Iref1; a voltage convert circuit 302 having an input terminal configured to receive the input voltage Vin, a first output terminal configured to provide a startup voltage converted digital signal TG_VS indicative of the input voltage Vin during a startup period of the switching mode power supply, and a second output terminal configured to provide a real time voltage converted digital signal TG_VR indicative of the real time input voltage Vin; a duty cycle convert circuit 303, having an input terminal configured to receive a duty cycle signal DT of the switching mode power supply and an output terminal configured to provide a duty cycle converted digital signal TG_D indicative of the duty cycle of the switching mode power supply; and a variable voltage generator 304 having a first input terminal coupled to the first output terminal of the voltage convert circuit 302 to receive the startup voltage converted digital signal TG_VS, a second input terminal coupled to the second output terminal of the voltage convert circuit 302 to receive the real time voltage converted digital signal TG_VR, a third input terminal coupled to the output terminal of the duty cycle convert circuit 303 to receive the duty cycle converted digital signal TG_D, and an output terminal configured to provide a variable voltage signal Iref2 based on the startup voltage converted digital signal TG_VS, the real time voltage converted digital signal TG_VR and the duty cycle converted digital signal TG_D; wherein a reference signal Iref is generated based on a sum operation on the constant voltage signal Iref1 and the variable voltage signal Iref2. In one embodiment, the reference signal Iref could be applied in the switching mode power supply of FIG. 1 as the peak current signal.

Persons of ordinary skill in the art should know that the duty cycle signal DT in the switching mode power supply 10 may comprise one of the high-side control signal HS and the low-side control signal LS, or both of the high-side control signal HS and the low-side control signal LS. As can be seen from FIG. 1, the switching mode power supply adopts BUCK topology. When the switching mode power supply has other topologies, the duty cycle signal DT may be different. For example, in a switching mode power supply with FLYBACK topology, the duty cycle signal DT may comprise a control signal of a main switch of the switching mode power supply. The duty cycle signal DT representing the duty cycle of the switching mode power supply with different topologies is known to persons of ordinary skill in the art and is not described here for brevity.

In one embodiment, during the startup period of the switching mode power supply, the value of the variable voltage signal Iref2 is directly proportional to the duty cycle of the switching mode power supply, and after the startup period of the switching mode power supply, the value of the variable voltage signal Iref2 is directly proportional to the ratio of the input voltage Vin at the end of the startup period to the real time input voltage Vin. That is to say, the variable voltage signal Iref2 could only be regulated by the input voltage Vin after startup period of the switching mode power supply.

Figure 4:
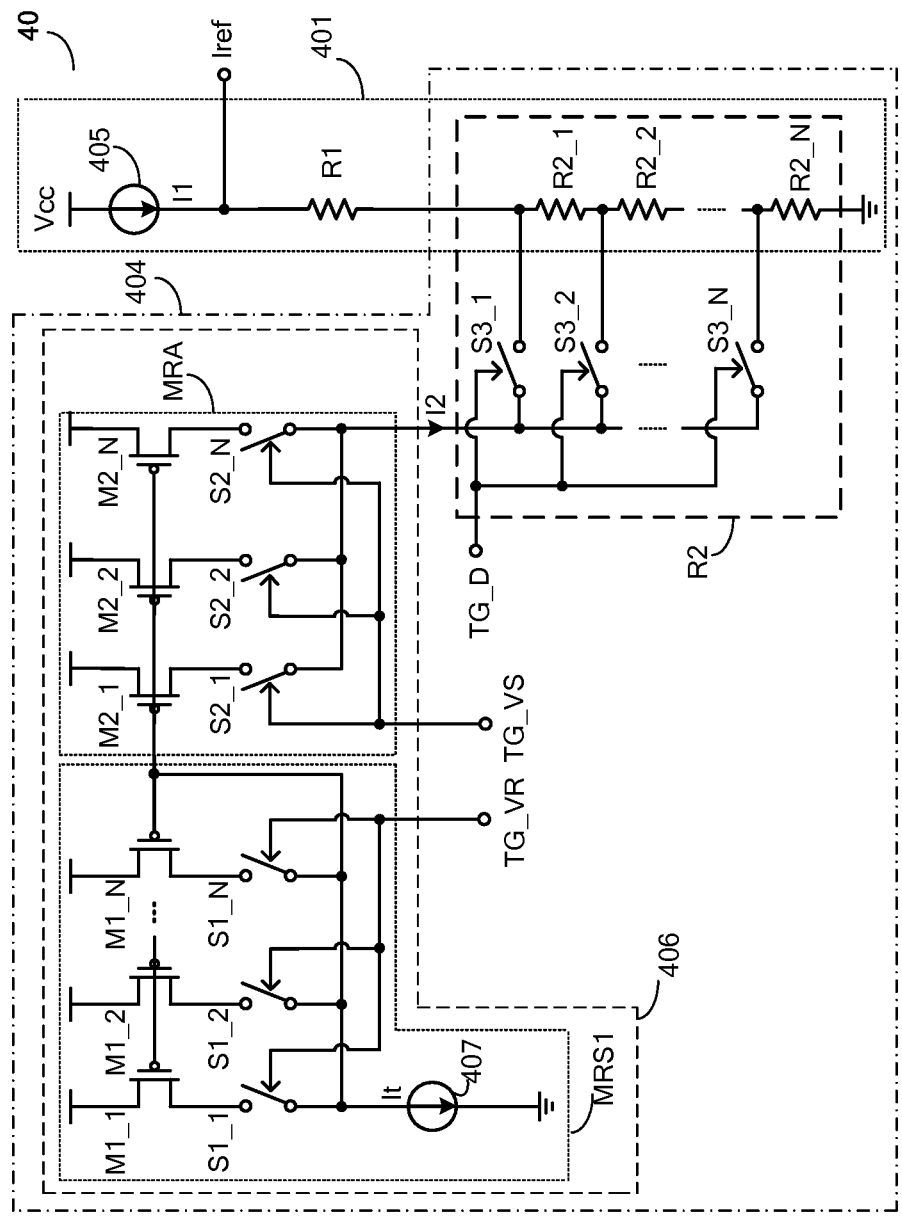
FIG. 4 schematically shows a reference signal generator 40 in accordance with an embodiment of the present invention.

FIG. 4 schematically shows a reference signal generator 40 in accordance with an embodiment of the present invention. As shown in FIG. 4, the reference signal generator 40 comprises: a reference current source 405 having an input terminal configured to receive an internal power supply Vcc and an output terminal configured to provide a preset reference current I1; a reference resistor R1 having a first terminal and a second terminal, wherein the first terminal is coupled to the output terminal of the reference current source 405 to receive the preset reference current I1; a compensation current source 406 having a first control terminal configured to receive the startup voltage converted digital signal TG_VS, a second control terminal configured to receive the real time voltage converted digital signal TG_VR, and an output terminal configured to provide a compensation current I2 based on the startup voltage converted digital signal TG_VS and the real time voltage converted digital signal TG_VR; and a compensation resistor R2 having a first terminal coupled to the output terminal of the compensation current source 406 to receive the compensation current I2, a second terminal coupled to the second terminal of the reference resistor R1, a third terminal connected to a ground reference and a control terminal configured to receive the duty cycle converted digital signal TG_D; wherein the reference signal Iref is provided at the connection node of the reference current source 405 and the reference resistor R1.

In one embodiment, the compensation current source 406 comprises a current mirror circuit including a source circuit MRS1 and a mirror circuit MRA. The mirror circuit MRA provides a current proportional to a current provided by the source circuit MRS1, wherein the proportion is controlled by the real time voltage converted digital signal TG_VR and the startup voltage converted digital signal TG_VS.

In one embodiment, the source circuit MRS1 comprises: a current source 407 configured to provide a current It, wherein the current source It having a first terminal and a second terminal, wherein the second terminal is connected to the ground reference; N current branches coupled in parallel between the internal power supply Vcc and the first terminal of the current source 407, wherein each current branch comprises a MOSFET and a switch coupled in series, and wherein a control terminal of each MOSFET is coupled to the first terminal of the current source 407, and a control terminal of each switch is coupled to the second output terminal of the voltage convert circuit 302 to receive the real time voltage converted digital signal TG_VR. The mirror circuit MRA comprises: N current branches coupled in parallel between the internal power supply Vcc and the first terminal of the compensation resistor R2, wherein each current branch comprises a MOSFET and a switch coupled in series, and wherein a control terminal of each MOSFET is coupled to the control terminals of the MOSFETs from the source circuit MRS1, and a control terminal of each switch is coupled to the first output terminal of the voltage convert circuit 302 to receive the startup voltage converted digital signal TG_VS. In one embodiment, N is an integer and N>1.

In one embodiment, the current provided by the compensation current source 406 is controlled by the input voltage Vin. During the startup period of the switching mode power supply, the startup voltage converted digital signal TG_VS has a same value with the real time voltage converted digital signal TG_VR. After the startup period, the startup voltage converted digital signal TG_VS remains the value at the end of the startup period unchanged while the real time voltage converted digital signal TG_VR varies according to the input voltage Vin all the time. Assuming the value of the corresponding input voltage Vin to the startup voltage converted digital signal TG_VS is Vin_S, and the value of the corresponding input voltage Vin to the real time voltage converted digital signal TG_VR is Vin_R, and Vin_S: Vin_R=a:1, wherein a>0, then the value of the current provided by the compensation current source 406 is It×a if N is large enough. During the startup period, because a=1, the current provided by the compensation current source 406 is equal to the current provided by the current source 407.

In one embodiment, the startup voltage converted digital signal TG_VS and the real time voltage converted digital signal TG_VR are binary signals with N digits. When N=4, the value of the startup voltage converted digital signal TG_VS and the real time voltage converted digital signal TG_VR may vary from 0001-1111. In one embodiment, binary signal 0001 corresponds to the minimum value of input voltage Vin and binary signal 1111 corresponds to the maximum value of input voltage Vin. In one embodiment, there is always one switch ON in both source circuit and mirror circuit. In one embodiment, the switch S1_1 is ON and the switches S1_2~S1_4 are OFF when the real time voltage converted digital signal TG_VR is 0001. The switches S1_1~S1_4 are all ON when the real time voltage converted digital signal TG_VR is 1111. The correspondence between the switches S2_1~S2_4 and the startup voltage converted digital signal TG_VS is similar with the previously described correspondence between the switches S1_1~S1_4 and the real time voltage converted digital signal TG_VR. In one embodiment, assuming there are three switches ON in both source circuit MRS1 and mirror circuit MRA at the end of the startup period of the switching mode power supply. Then the switches are all ON in the source circuit when the input voltage Vin increases after the startup period, which means the proportion of the current provided by the mirror circuit MRA to the current of the source circuit MRS1 is 3:4. As a result, the mirror circuit MRA provides current I2=It×(¾). In a similar way, if there are only two switches ON in the source circuit as the input voltage Vin decreases after the startup period, the current I2=It×(3/2).

In one embodiment, the compensation resistor R2 comprises: N switches S3_1~S3_N, wherein each switch has a first terminal, a second terminal and a control terminal, and wherein the first terminal of each switch is coupled to the output terminal of the compensation current source 406, and the control terminal of each switch is coupled to the output terminal of the duty cycle convert circuit 303 to receive the duty cycle converted digital signal TG_D; and N resistors R2_1~R2_N coupled in series between the second terminal of the reference resistor R1 and the ground reference, wherein each resistor has a first terminal and a second terminal, the first terminal of the resistor R2_1 coupled to the second terminal of the reference resistor R1 and the second terminal of the first switch S3_1, the second terminal of the resistor R2_N connected to the ground reference, the first terminal of the resistor R2_i coupled to the second terminal of the resistor R2_i−1 and the second terminal of the switch S3_i, wherein 1<i≤N and R2=R2_1+R2_2+ . . . +R2_N.

In one embodiment, the duty cycle converted digital signal TG_D is a binary signal with N digits. When N=4, the value of the duty cycle converted digital signal TG_D varies from 0000-1000. In one embodiment, binary signal 0000 corresponds to the minimum value of duty cycle signal DT and binary signal 1000 corresponds to the maximum value of duty cycle signal DT. In one embodiment, the switches S3_1~S3_4 are all OFF when the duty cycle converted digital signal TG_D is 0000, and the value of the reference signal Iref is I1×(R1+R2); the switch S3_1 is ON and the switches S3_2~S3_4 are all OFF when the duty cycle converted digital signal TG_D is 1000, and the value of the reference signal Iref is I1×(R1+R2)+I2×R2; The switch S3_4 is ON and the switches S3_1~S3_3 are all OFF when the duty cycle converted digital signal TG_D is 0001, and the value of the reference signal Iref is I1×(R1+R2)+I2×R2_4; The switch S3_3 is ON and the switches S3_1, S3_2 and S3_4 are all OFF when the duty cycle converted digital signal TG_D is 0010, and the value of the reference signal Iref is I1×(R1+R2)+I2×R2_3; and so on. In one embodiment, Iref=I1×(R1+R2)+I2×R2×DT=I1×(R1+R2)+It×a×R2×DT if N is large enough. In one embodiment, the duty cycle converted digital signal TG_D is constant after the startup period of the switching mode power supply. As known from the above description, the larger the duty cycle of the switching mode power supply, the larger the variable voltage signal Iref2 and the reference signal Iref. Thereby the error caused by the slope compensation signal Islope could be eliminated.

Persons of ordinary skill in the art should know that the startup voltage converted digital signal TG_VS, the real time voltage converted digital signal TG_VR and the duty cycle converted digital signal TG_D may comprise digits in other forms and the correspondence to the on and off of the switches may be different as a result.

In one embodiment, the reference current source 405, the reference resistor R1 and the compensation resistor R2 constitute the constant voltage generator 301 of FIG. 3. Meanwhile, the compensation current source 406 and the compensation resistor R2 constitute the variable voltage generator 304 of FIG. 3.

Figure 5:
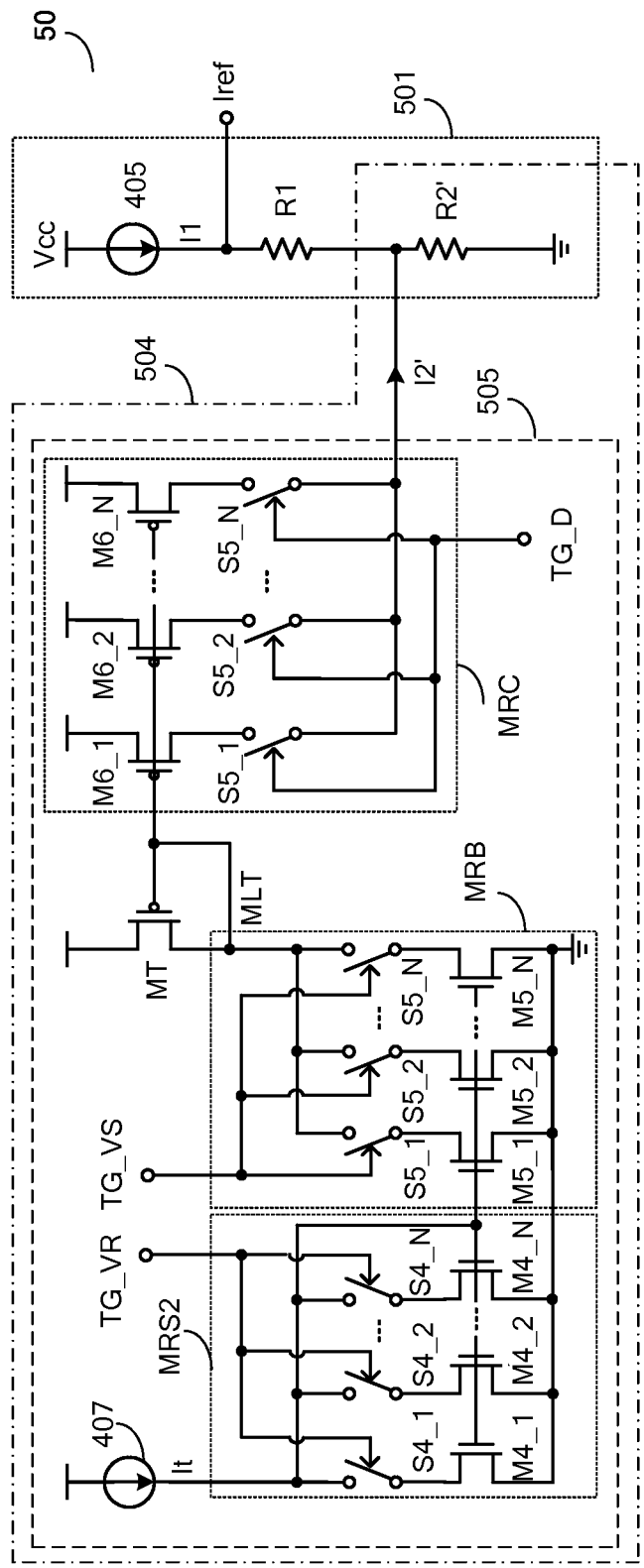
FIG. 5 schematically shows a reference signal generator 50 in accordance with an embodiment of the present invention.

FIG. 5 schematically shows a reference signal generator 50 in accordance with an embodiment of the present invention. As shown in FIG. 5, the reference signal generator 50 comprises: the reference current source 405 having the input terminal configured to receive an internal power supply Vcc and the output terminal configured to provide the preset reference current I1; the reference resistor R1 having the first terminal and the second terminal, wherein the first terminal is coupled to the output terminal of the reference current source 405 to receive the preset reference current I1; a compensation current source 505 having a first control terminal configured to receive the startup voltage converted digital signal TG_VS, a second control terminal configured to receive the real time voltage converted digital signal TG_VR, a third control terminal configured to receive a duty cycle converted digital signal TG_D, and an output terminal configured to provide a compensation current I2' based on the startup voltage converted digital signal TG_VS, the real time voltage converted digital signal TG_VR and the duty cycle converted digital signal TG_D; and a compensation resistor R2' having a first terminal coupled to the output terminal of the compensation current source 505 to receive the compensation current I2', a second terminal connected to a ground reference; wherein the reference signal Iref is provided at the connection node of the reference current source 405 and the reference resistor R1.

In one embodiment, the compensation current source 505 comprises a current mirror circuit including a source circuit MRS2, a first mirror circuit MRB and a second mirror circuit MRC. The first mirror circuit MRB provides a current directly proportional to a current provided by the source circuit MRS2, and the proportion is controlled by the real time voltage converted digital signal TG_VR and the startup voltage converted digital signal TG_VS. The second mirror circuit MRC provides a current directly proportional to the current provided by the first mirror circuit MRB, and the proportion is controlled by the startup voltage converted digital signal TG_VS and the duty cycle converted digital signal TG_D.

In one embodiment, the source circuit MRS2 comprises: the current source 407 having the first terminal and the second terminal, wherein the first terminal is coupled to the internal power supply Vcc; N current branches coupled in parallel between the second terminal of the current source 407 and the ground reference, wherein each current branch comprises a MOSFET and a switch, and wherein each MOSFET has a control terminal coupled to the second terminal of the current source 407, and each switch has a control terminal coupled to the second output terminal of the voltage convert circuit 302 to receive the real time voltage converted digital signal TG_VR. The first mirror circuit MRB comprises: N current branches coupled in parallel between the a common node MLT and the ground reference, wherein each current branch comprises a MOSFET and a switch, and wherein each MOSFET has a control terminal coupled to the control terminals of the MOSFETs from the source circuit MRS2, and each switch has a control terminal coupled to the first output terminal of the voltage convert circuit 302 to receive the startup voltage converted digital signal TG_VS. The second mirror circuit MRC comprises: a transfer MOSFET MT coupled between the internal power supply Vcc and the common node MLT, wherein the transfer MOSFET MT has a control terminal coupled to the common node MLT; N current branches coupled in parallel between the internal power supply Vcc and the first terminal of the compensation resistor R2', wherein each current branch comprises a MOSFET and a switch, and wherein each MOSFET has a control terminal coupled to the control terminal of the transfer MOSFET MT, and each switch has a control terminal coupled to the output terminal of the duty cycle convert circuit 303 to receive the duty cycle converted digital signal TG_D.

The operations of the source circuit MRS2 and the first mirror circuit MRB are similar with operations of the source circuit MRS1 and the mirror circuit MRA in FIG. 4. The current provided by the first mirror circuit MRB is transferred to the second mirror circuit MRC via the transfer MOSFET MT. Because the second mirror circuit MRC is controlled by the duty cycle converted digital signal TG_D, the current provided by the second mirror circuit MRC, i.e., the current provided by the compensation current source 505, is I1×a×DT if N is large enough.

As known from the above description, the value of the reference signal generator 50 is Iref=I1×(R1+R2')+I2'×R2'=I1×(R1+R2')+I1×a×DT×R2'. In one embodiment, the duty cycle converted digital signal TG_D is fixed and the current provided by the compensation current source 505 is only regulated by the real time voltage converted digital signal TG_VR.

Figure 6:
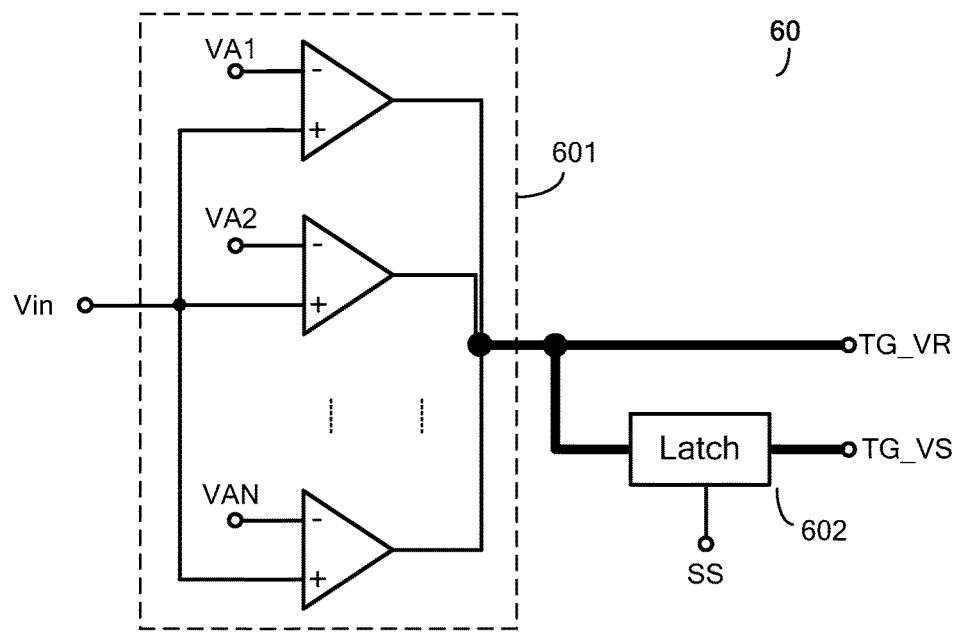
FIG. 6 schematically shows a voltage convert circuit 60 in accordance with an embodiment of the present invention.

FIG. 6 schematically shows a voltage convert circuit 60 in accordance with an embodiment of the present invention. As shown in FIG. 6, the voltage convert circuit 60 comprises: a comparison circuit 601 having N comparators, wherein each comparator has a first input terminal, a second terminal and an output terminal, wherein the first input terminals of the comparators respectively receive threshold signals VA1~VAN, the second input terminals of the comparators receive the input voltage Vin, and the output terminal of each comparator provides a digit to finally form the real time voltage converted digital signal TG_VR; and a latch circuit 602 having an input terminal coupled to the output terminal of the comparison circuit 601 to receive the real time voltage converted digital signal TG_VR, a control terminal configured to receive a startup complete signal SS indicating the end of the startup period of the switching mode power supply, and an output terminal configured to provide the startup voltage converted digital signal TG_VS based on the real time voltage converted digital signal TG_VR and the startup complete signal SS. After the startup period of the switching mode power supply, the latch circuit 602 keeps the value of the startup voltage converted digital signal TG_VS unchanged. The startup complete signal SS is known to persons of ordinary skill in the art and could be obtained in several ways. For example, the startup complete signal SS could be a comparison result of the output voltage of the switching mode power supply with a preset voltage reference.

In one embodiment, the threshold signals VA1~VAN have different values. In one embodiment, the minimum value of the threshold signals VA1~VAN is zero, and the maximum value of the threshold signals VA1~VAN is related to the maximum value of the input voltage Vin. In one embodiment, assuming there are four comparators in the comparison circuit 601, i.e., N=4, and meanwhile VA1<VA2<VA3<VA4. When the input voltage Vin is lower than all of the threshold signals VA1~VA4, the output signals of the comparators are all low level voltage signals and the value of the real time voltage converted digital signal TG_VR is 0000. When the input voltage Vin is larger than all of the threshold signals VA1~VA4, the output signals of the comparators are all high level voltage signals and the value of the real time voltage converted digital signal TG_VR is 1111. When VA1<Vin<VA2<VA3<VA4, the real time voltage converted digital signal TG_VR is 0001, and so on.

If the input voltage Vin is too large, a voltage divider may be used to sample the input voltage Vin and the sampled voltage instead of the input voltage Vin may be applied to the comparison circuit 602. The voltage divider is known to persons of ordinary skill in the art, e.g., may comprise two resistors coupled in series, and is not described here for brevity.

Figure 7:
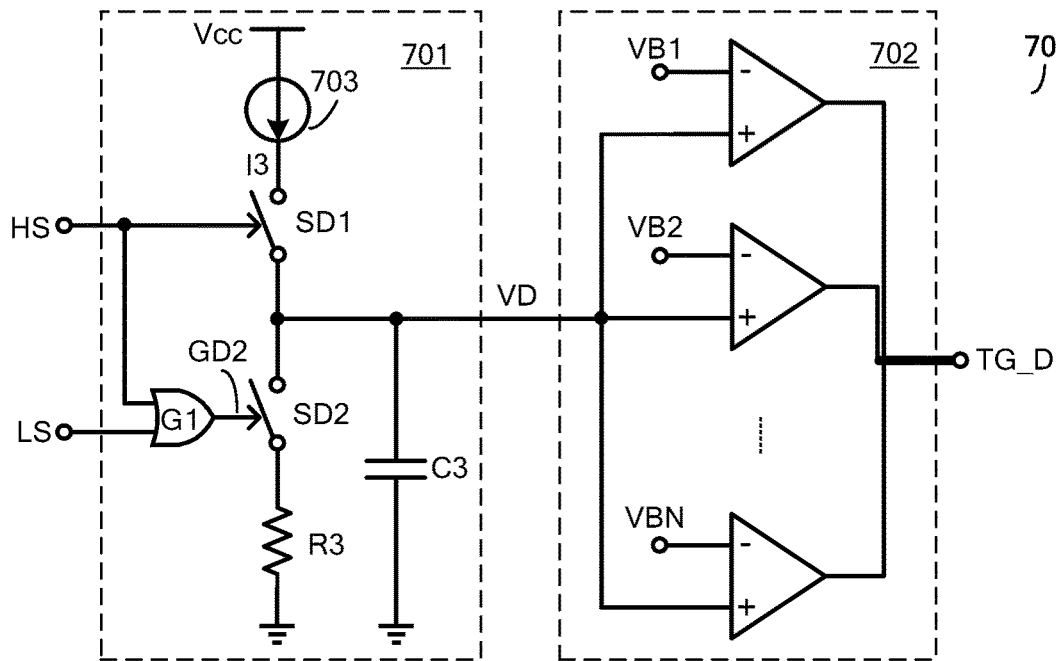
FIG. 7 schematically shows a duty cycle convert circuit 70 in accordance with an embodiment of the present invention.

FIG. 7 schematically shows a duty cycle convert circuit 70 in accordance with an embodiment of the present invention. As shown in FIG. 7, the duty cycle convert circuit 70 comprises: a frequency-voltage converter 701 having an input terminal configured to receive the duty cycle signal DT and an output terminal configured to provide a voltage signal VD indicating the duty cycle of the switching mode power supply based on the duty cycle signal DT; a comparison circuit 702 having N comparators, wherein each comparator has a first input terminal, a second terminal and an output terminal, and wherein the first input terminals of the comparators respectively receive threshold signals VB1~VBN, the second input terminals of the comparators receive the voltage signal VD, and the output terminal of each comparator provides a digit to finally form the duty cycle converted digital signal TG_D.

In one embodiment, the duty cycle signal DT comprises the high-side control signal HS and the low-side control signal LS. The frequency-voltage converter 701 comprises: a current source 703 having a first terminal coupled to the internal power supply Vcc, and an output terminal provides a preset current I3; a duty cycle switch SD1, having a first terminal, a second terminal and a control terminal, wherein the first terminal is coupled to the second terminal of the current source 703 to receive the preset current I3, the control terminal is configured to receive the high-side control signal HS; a logic circuit G1 having a first input terminal, a second input terminal and an output terminal, wherein the first input terminal is configured to receive the high-side control signal HS, the second terminal is configured to receive the low-side control signal LS, and the output terminal is configured to provide a switch control signal GD2; a duty cycle switch SD2, having a first terminal, a second terminal and a control terminal, wherein the first terminal is coupled to the second terminal of the duty cycle switch SD1, and the control terminal is coupled to the output terminal of the logic circuit G1 to receive the switch control signal GD2; a resistor R3 coupled in series with the duty cycle switch SD2 between the second terminal of the duty cycle switch SD1 and the ground reference; and a capacitor C3 coupled between the second terminal of the duty cycle switch SD1 and ground reference.

In one embodiment, the logic circuit G1 comprises an OR gate circuit. The duty cycle switch SD2 is turned OFF by the switch control signal GD2 when the high-side power switch PM1 and the low-side power switch PM2 are both turned OFF.

In one embodiment, the duty cycle switch SD1 is turned ON when the high-side power switch PM1 is ON and the low-side power switch PM2 is OFF, and is turned OFF when the high-side power switch PM1 is OFF and the low-side power switch PM2 is ON. The current provided by the current source 703 flows through the resistor R3 and the capacitor C3 when the duty cycle switch SD1 is ON to build the voltage signal VD. The duty cycle switch SD2 is turned OFF to maintain the voltage signal VD when the high-side power switch PM1 and the low-side power switch PM2 are both OFF.

In one embodiment, the high-side power switch PM1 and the low-side power switch PM2 will not be OFF at once, and the duty cycle signal DT comprises one of the high-side power switch PM1 and the low-side power switch PM2. In that case, the logic circuit G1 could be omitted. The high-side control signal HS or the low-side control signal LS controls the duty cycle switches SD1 and SD2 directly.

In one embodiment, the comparison circuit 702 is coupled to the output terminal of the frequency-voltage converter 701 to receive the voltage signal VD, and generates the duty cycle converted digital signal TG_D based thereupon. The operation of the comparison circuit 702 is similar with the operation of the comparison circuit 601 of FIG. 6, and is not described here for brevity.

In one embodiment, the threshold signals VB1~VBN have different values. The minimum value of the threshold signals VB1~VBN is zero, and the maximum value of the threshold signals VB1~VBN is related to the maximum value of the voltage signal VD. The values of the threshold signals VB1~VBN vary in different systems. Persons of ordinary skill in the art could set the threshold signals under the instruction of the present invention.

In one embodiment, assuming there are four comparators in the comparison circuit 702, i.e., N=4, and meanwhile VB1<VB2<VB3<VB4. When the voltage signal VD is lower than all of the threshold signals VB1~VB4, the output signals of the comparators are all low level voltage signals and the value of the duty cycle converted digital signal TG_D is 0000. When the voltage signal VD is larger than all of the threshold signals VB1~VB4, the output signals of the comparators are all high level voltage signals and the value of the duty cycle converted digital signal TG_D is 1111. When VB1<VD<VB2<VB3<VB4, the duty cycle converted digital signal TG_D is 0001, and so on.

Persons of ordinary skill in the art should know that other circuits, e.g., a circuit comprising diodes, may convert the voltage signal VD to the duty cycle converted digital signal TG_D. The duty cycle convert circuit may also be realized by describing the functions in hard ware description language, e.g., Verilog or VHDL, and so on.

The reference signal Iref generated by the reference signal generator could be applied as the reference signal of the compensated current sense signal in a switching mode power supply, to eliminate the output current fluctuation caused by the slope compensation signal.

Figure 8:
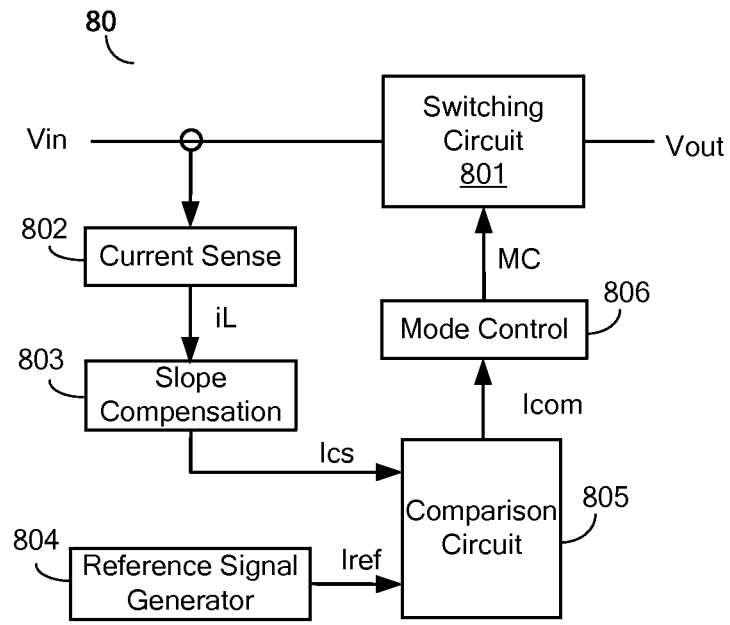
FIG. 8 schematically shows a block diagram of a switching mode power supply 80.

FIG. 8 schematically shows a block diagram of a switching mode power supply 80. The switching mode power supply 80 comprises: a switching circuit 801 including an inductor, wherein the switching circuit 801 is configured to convert an input voltage Vin to an output voltage Vout; a current sense circuit 802 having an input terminal and an output terminal, wherein the input terminal is coupled to the switching circuit 801 to sense a current flowing through the inductor of the switching circuit 801, and based on the current flowing through the inductor, the current sense circuit 802 generates the current sense signal iL at the output terminal; a slope compensation circuit 803 having an input terminal and an output terminal, wherein the input terminal is coupled to the current sense circuit 802 to receive the current sense signal iL, and the slope compensation circuit 803 performs a sum operation on a slope compensation signal and the current sense signal iL to generate a compensated current sense signal Ics at the output terminal; a reference signal generator 804 configured to generate the reference signal Iref; a comparison circuit 805 having a first input terminal, a second input terminal and an output terminal, wherein the first input terminal is coupled to the slope compensation circuit 803 to receive the compensated current sense signal Ics, the second input terminal is coupled to the reference signal generator 804 to receive the reference signal Iref, and based on the compensated current sense signal Ics and the reference signal Iref, the comparison circuit 805 generates a comparison result Icom at the output terminal; and a mode control circuit 806 having an input terminal and an output terminal, wherein the input terminal is coupled to the comparison circuit 805 to receive the comparison result Icom, and based on the comparison result Icom, the mode control circuit 806 provides a mode control signal MC at the output terminal; wherein the switching circuit 801 receives the mode control signal MC, and works under different modes according to the mode control signal MC.

In one embodiment, the reference signal generator 804 comprises one of the reference signal generator 30 in FIG. 3, the reference signal generator 40 in FIG. 4 and the reference signal generator 50 in FIG. 5.

In one embodiment, the switching circuit 801 may work under PWM (Pulse Width Modulation) mode or PFM (Pulse Frequency Modulation) mode. After the startup period of the switching mode power supply 80, the compensated current sense signal Ics is compared to the reference signal Iref to generate the comparison result Icom. In one embodiment, the switching mode power supply 80 works under PWM mode when the compensated current sense signal Ics is larger than the reference signal Iref and the comparison result Icom is at a first voltage level, e.g., high voltage level; the switching mode power supply works under PFM mode when the compensated current sense signal Ics is lower than the reference signal Iref and the comparison result Icom is at a second voltage level, e.g., low voltage level.

In one embodiment, the comparison circuit 805 comprises several comparators.

Persons of ordinary skill in the art should know that the switching circuit 801 may work under several modes other than PWM mode or PFM mode. The switching mode power supply 80 may comprise several reference signal generator to generate several reference signals with different values to be as the references of the current sense signal Ics, so that to control the switching circuit to work under several modes.

Figure 9:
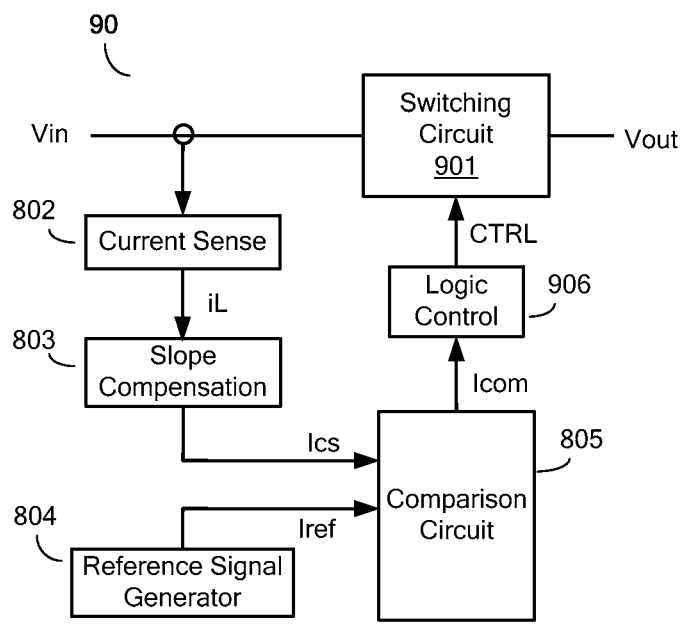
FIG. 9 schematically shows a block diagram of a switching mode power supply 90 in accordance with an embodiment of the present invention.

FIG. 9 schematically shows a block diagram of a switching mode power supply 90 in accordance with an embodiment of the present invention. The switching mode power supply 90 comprises: a switching circuit 901 including the inductor, wherein the switching circuit 901 is configured to convert an input voltage Vin to an output voltage Vout; the current sense circuit 802 having the input terminal and the output terminal, wherein the input terminal is coupled to the input terminal of the switching circuit 901 to sense a current flowing through the inductor of the switching circuit 901, and based on the current flowing through the inductor, the current sense circuit 802 generates the current sense signal iL at the output terminal; the slope compensation circuit 803 having the input terminal and the output terminal, wherein the input terminal is coupled to the current sense circuit 802 to receive the current sense signal iL, and the slope compensation circuit 803 performs a sum operation on a slope compensation signal and the current sense signal iL to generate a compensated current sense signal Ics at the output terminal; the reference signal generator 804 configured to generate the reference signal Iref; the comparison circuit 805 having the first input terminal, the second input terminal and the output terminal, wherein the first input terminal is coupled to the slope compensation circuit 803 to receive the compensated current sense signal Ics, the second input terminal is coupled to the reference signal generator 804 to receive the reference signal Iref, and based on the compensated current sense signal Ics and the reference signal Iref, the comparison circuit 805 generates a comparison result Icom at the output terminal; a logic control circuit 906 having an input terminal and an output terminal, wherein the input terminal is coupled to the comparison circuit 805 to receive the comparison result Icom, and based on the comparison result Icom, the logic control circuit 906 provides a control signal CTRL at the output terminal; wherein the switching circuit 901 receives the control signal CTRL, and works under the control of the control signal CTRL.

In one embodiment, the logic control circuit 906 comprises the clock circuit and the RS flip-flop in FIG. 1, and the control signal CTRL comprises the high-side control signal HS. The switching circuit 901 comprises the high-side power switch and the low-side power switch being turned ON and OFF by the high-side control signals HS.

Persons of ordinary skill in the art should know that the switching circuit 801 and the switching circuit 901 may be realized with BUCK topology, BUCK-BOOST topology, FLYBACK topology and so on.

Figure 10:
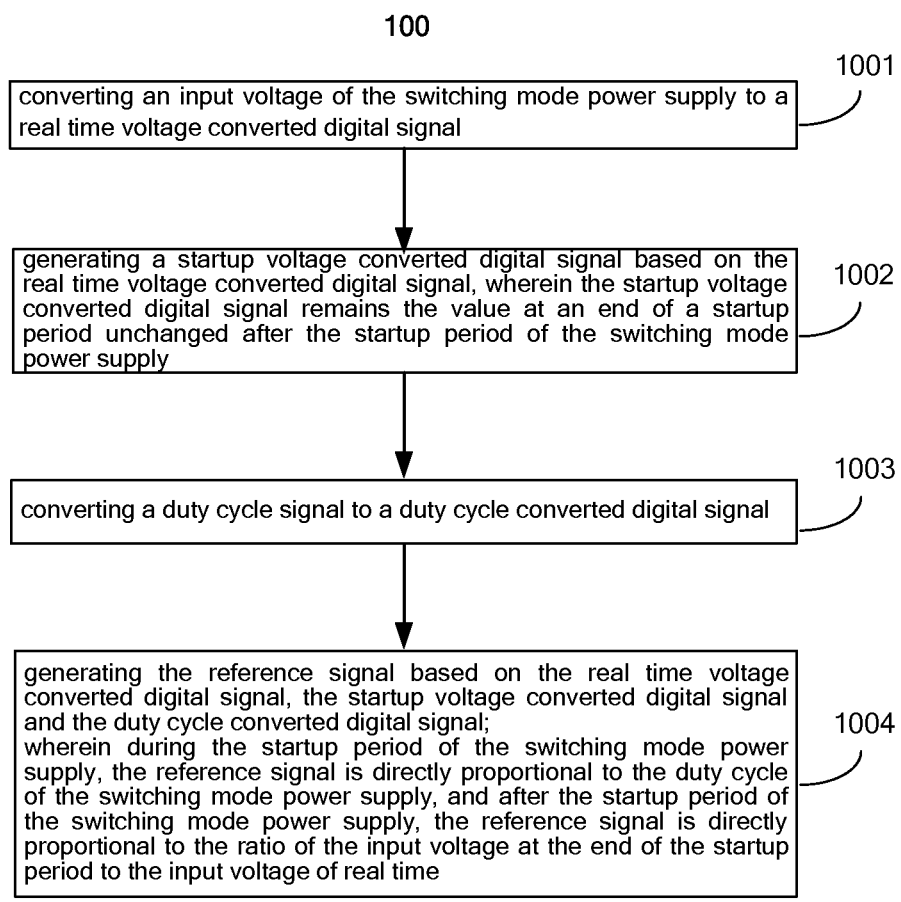
FIG. 10 shows a flow chart of a method 100 of generating a reference signal.

FIG. 10 shows a flow chart of a method 100 of generating a reference signal. The reference signal may be applied in a switching mode power supply. The method 100 comprises: step 1001, converting an input voltage of the switching mode power supply to a real time voltage converted digital signal; step 1002, generating a startup voltage converted digital signal based on the real time voltage converted digital signal, wherein the startup voltage converted digital signal remains the value at an end of a startup period unchanged after the startup period of the switching mode power supply; step 1003, converting the duty cycle signal to a duty cycle converted digital signal; and step 1004, generating the reference signal based on the real time voltage converted digital signal, the startup voltage converted digital signal and the duty cycle converted digital signal; wherein during the startup period of the switching mode power supply, the reference signal is directly proportional to the duty cycle of the switching mode power supply, and after the startup period of the switching mode power supply, the reference signal is directly proportional to the ratio of the input voltage at the end of the startup period to the input voltage of real time.

In one embodiment, the step 1003 comprises: converting the duty cycle signal to a voltage signal; and converting the voltage signal to the duty cycle converted digital signal.

In one embodiment, the step 1004 comprises: applying a constant current to a constant resistor to generate a constant voltage signal; applying a variable current to a variable resistor to generate a variable voltage signal; performing a sum operation on the constant voltage signal and the variable voltage signal to generate the reference signal; adjusting the variable current according to the real time voltage converted digital signal and the startup voltage converted digital signal; and adjusting the resistance of the variable resistor according to the duty cycle converted digital signal.

In one embodiment, the step 1004 comprises: applying a constant current to a first constant resistor to generate a constant voltage signal; applying a variable current to a second constant resistor to generate a variable voltage signal; performing a sum operation on the constant voltage signal and the variable voltage signal to generate the reference signal; and adjusting the variable current according to the real time voltage converted digital signal, the startup voltage converted digital signal and the duty cycle converted digital signal.

The present invention provides a variable reference signal. The variable reference signal varies according to the duty cycle of the switching mode power supply during the startup period and varies according to the input voltage of the switching mode power supply after the startup period of the switching mode power supply, so that to offset the error caused by the slope compensation signal which is added to a current flowing through an inductor of the switching mode power supply. As a result, the peak of the inductor current signal may precisely follow a preset value, and the fluctuation of the output current of the switching mode power supply is eliminated. Meanwhile, the variable reference signal may be adopted as a threshold of the mode switching.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A reference signal generator used with a switching mode power supply, wherein the switching mode power supply converts an input voltage to an output voltage, comprising:
  a constant voltage generator configured to provide a constant voltage signal;
  a voltage convert circuit having an input terminal configured to receive the input voltage, a first output terminal configured to provide a startup voltage converted digital signal indicative of the input voltage during a startup period of the switching mode power supply, and a second output terminal configured to provide a real time voltage converted digital signal indicative of the real time input voltage;

a duty cycle convert circuit, having an input terminal configured to receive a duty cycle signal indicative of a duty cycle of the switching mode power supply, and an output terminal configured to provide a duty cycle converted digital signal indicative of the duty cycle of the switching mode power supply; and a variable voltage generator having a first input terminal coupled to the first output terminal of the voltage convert circuit to receive the startup voltage converted digital signal, a second input terminal coupled to the second output terminal of the voltage convert circuit to receive the real time voltage converted digital signal, a third input terminal coupled to the output terminal of the duty cycle convert circuit to receive the duty cycle converted digital signal, and an output terminal configured to provide a variable voltage signal based on the startup voltage converted digital signal, the real time voltage converted digital signal and the duty cycle converted digital signal;

wherein during the startup period of the switching mode power supply, a value of the variable voltage signal is directly proportional to the duty cycle of the switching mode power supply, and after the startup period of the switching mode power supply, the value of the variable voltage signal is directly proportional to the ratio of the input voltage at the end of the startup period to the real time input voltage, and wherein a reference signal is generated based on a sum of the constant voltage signal and the variable voltage signal.

2. The reference signal generator of claim 1, wherein the constant voltage generator comprises:

a reference current source having an input terminal configured to receive an internal power supply and an output terminal configured to provide a preset reference current;

a reference resistor having a first terminal and a second terminal, wherein the first terminal is coupled to the output terminal of the reference current source to receive the preset reference current; and a compensation resistor coupled between the second terminal of the reference resistor and a ground reference;

wherein the preset current provided by the reference current source flows through the reference resistor and the compensation resistor to generate the constant voltage signal across the reference resistor and the compensation resistor.

3. The reference signal generator of claim 1, wherein the voltage convert circuit comprises:

a comparison circuit including N comparators, wherein each comparator has a first input terminal, a second terminal and an output terminal, and wherein the first input terminals of the comparators respectively receive threshold signals with different values, the second input terminals of the comparators receive the input voltage, and the output terminal of each comparator provides a digit to finally form the real time voltage converted digital signal; and a latch circuit having an input terminal coupled to the output terminal of the comparison circuit to receive the real time voltage converted digital signal, a control terminal configured to receive a startup complete signal indicating a end of the startup period of the switching mode power supply, and an output terminal configured to provide the startup voltage converted digital signal based on the real time voltage converted digital signal and the startup complete signal;

wherein N is an integer and N>1.

4. The reference signal generator of claim 1, wherein the duty cycle convert circuit comprises:

a frequency-voltage converter having an input terminal configured to receive the duty cycle signal and an output terminal configured to provide a voltage signal indicating the duty cycle of the switching mode power supply based on the duty cycle signal;

a comparison circuit having N comparators, wherein each comparator has a first input terminal, a second terminal and an output terminal, and wherein the first input terminals of the comparators respectively receive threshold signals with different values, the second input terminals of the comparators receive the voltage signal, and the output terminal of each comparator provides a digit to finally form the duty cycle converted digital signal;

wherein N is an integer and N>1.

5. The reference signal generator of claim 2, wherein the variable voltage generator comprises:

a compensation current source having a first control terminal configured to receive the startup voltage converted digital signal, a second control terminal configured to receive the real time voltage converted digital signal, and an output terminal configured to provide a compensation current based on the startup voltage converted digital signal and the real time voltage converted digital signal; and the compensation resistor having a first terminal coupled to the output terminal of the compensation current source to receive the compensation current, a second terminal coupled to the second terminal of the reference resistor, a third terminal connected to the ground reference and a control terminal configured to receive the duty cycle converted digital signal;

wherein the compensation current flows through part of the compensation resistor to generate the variable voltage signal, and the reference signal is provided at the connection node of the reference current source and the reference resistor.

6. The reference signal generator of claim 2, wherein the variable voltage generator comprises:

a compensation current source having a first control terminal configured to receive the startup voltage converted digital signal, a second control terminal configured to receive the real time voltage converted digital signal, a third control terminal configured to receive a duty cycle converted digital signal, and an output terminal configured to provide a compensation current based on the startup voltage converted digital signal, the real time voltage converted digital signal and the duty cycle converted digital signal; and the compensation resistor having a first terminal coupled to the output terminal of the compensation current source to receive the compensation current, a second terminal connected to the ground reference;

wherein the reference signal is provided at the connection node of the reference current source and the reference resistor.

7. The reference signal generator of claim 4, wherein the frequency-voltage converter comprises:
   a current source having a first terminal coupled to an internal power supply, and an output terminal configured to provide a preset current;
   a first duty cycle switch, having a first terminal, a second terminal and a control terminal, wherein the first terminal is coupled to the second terminal of the current source to receive the preset current, the control terminal is configured to receive a high-side control signal of the switching mode power supply;
   a logic circuit having a first input terminal, a second input terminal and an output terminal, wherein the first input terminal is configured to receive the high-side control signal, the second terminal is configured to receive a low-side control signal of the switching mode power supply, and the output terminal is configured to provide a switch control signal;
   a second duty cycle switch, having a first terminal, a second terminal and a control terminal, wherein the first terminal is coupled to the second terminal of the first duty cycle switch, and the control terminal is coupled to the output terminal of the logic circuit to receive the switch control signal;
   a resistor coupled in series with the second duty cycle switch between the second terminal of the first duty cycle switch and a ground reference; and
   a capacitor coupled between the second terminal of the first duty cycle switch and the ground reference.

8. The reference signal generator of claim 5, wherein the compensation current source comprises:
   a source circuit including:
   a current source having a first terminal and a second terminal, wherein the second terminal is connected to the ground reference;
   a first set of N current branches coupled in parallel between the internal power supply and the first terminal of the current source, wherein each current branch comprises a MOSFET and a switch coupled in series, and wherein a control terminal of each MOSFET is coupled to the first terminal of the current source, and a control terminal of each switch is coupled to the second output terminal of the voltage convert circuit to receive the real time voltage converted digital signal; and
   a mirror circuit including:
      a second set of N current branches coupled in parallel between the internal power supply and the first terminal of the compensation resistor, wherein each current branch comprises a MOSFET and a switch coupled in series, and wherein a control terminal of each MOSFET coupled to the control terminal of the MOSFET from the source circuit, and a control terminal of each switch is coupled to the first output terminal of the voltage convert circuit to receive the startup voltage converted digital signal;
      wherein N is an integer and N>1.

9. The reference signal generator of claim 5, wherein the compensation resistor comprises:
   N switches, wherein each switch has a first terminal, a second terminal and a control terminal, and wherein the first terminal of each switch is coupled to the output terminal of the compensation current source, and the control terminal of each switch is coupled to the output terminal of the duty cycle convert circuit to receive the duty cycle converted digital signal; and
   N resistors coupled in series between the second terminal of the reference resistor and the ground reference, wherein each resistor has a first terminal and a second terminal, the first terminal of a first resistor coupled to the second terminal of the reference resistor and the second terminal of the first switch, the second terminal of the N-th resistor connected to the ground reference, and the second terminal of the i-th switch is coupled to the connection node of second terminal of the (i−1)-th resistor and the first terminal of the i-th resistor, and wherein 1<i≤N, and wherein N is an integer and N>1.

10. The reference signal generator of claim 6, wherein the compensation current source comprises:
   a source circuit including:
   a current source having a first terminal and a second terminal, wherein the first terminal is coupled to the internal power supply;
   a first set of N current branches coupled in parallel between the second terminal of the current source and the ground reference, wherein each current branch comprises a MOSFET and a switch, and wherein each MOSFET has a control terminal coupled to the second terminal of the current source, and each switch has a control terminal coupled to the second output terminal of the voltage convert circuit to receive the real time voltage converted digital signal;
   a first mirror circuit including:
   a second set of N current branches coupled in parallel between a common node and the ground reference, wherein each current branch comprises a MOSFET and a switch, and wherein each MOSFET has a control terminal coupled to the control terminals of the MOSFETs from the source circuit, and each switch has a control terminal coupled to the first output terminal of the voltage convert circuit to receive the startup voltage converted digital signal;
   a second mirror circuit including:
   a transfer MOSFET coupled between the internal power supply and the common node, wherein the transfer MOSFET has a control terminal coupled to the common node; and
   a third set of N current branches coupled in parallel between the internal power supply and the first terminal of the compensation resistor, wherein each current branch comprises a MOSFET and a switch, and wherein each MOSFET has a control terminal coupled to the control terminal of the transfer MOSFET, and each switch has a control terminal coupled to the output terminal of the duty cycle convert circuit to receive the duty cycle converted digital signal;
   wherein N is an integer and N>1.

11. A switching mode power supply comprising:
   a switching circuit including an inductor, wherein the switching circuit is configured to convert an input voltage to an output voltage;
   a current sense circuit having an input terminal and an output terminal, wherein the input terminal is coupled to the switching circuit to sense a current flowing through the inductor of the switching circuit, and based on the current flowing through the inductor, the current sense circuit generates a current sense signal at the output terminal;
   a slope compensation circuit having an input terminal and an output terminal, wherein the input terminal is coupled to the current sense circuit to receive the current sense signal, and the slope compensation circuit performs a sum operation on a slope compensation signal and the current sense signal to generate a compensated current sense signal at the output terminal;

a reference signal generator configured to generate a reference signal, wherein the reference signal consists a constant voltage signal and a variable voltage signal which is directly proportional to a duty cycle of the switching mode power supply during the startup period of the switching mode power supply, and is directly proportional to the ratio of the input voltage at the end of the startup period to the real time input voltage after the startup period of the switching mode power supply;

a comparison circuit having a first input terminal, a second input terminal and an output terminal, wherein the first input terminal is coupled to the slope compensation circuit to receive the compensated current sense signal, the second input terminal is coupled to the reference signal generator to receive the reference signal, and based on the compensated current sense signal and the reference signal, the comparison circuit generates a comparison result at the output terminal; and a mode control circuit having an input terminal and an output terminal, wherein the input terminal is coupled to the comparison circuit to receive the comparison result, and based on the comparison result, the mode control circuit provides a mode control signal at the output terminal;

wherein the switching circuit receives the mode control signal, and works under different modes according to the mode control signal.

12. The switching mode power supply of claim 11, wherein the reference signal generator comprises:

a constant voltage generator configured to provide a constant voltage signal; and a variable voltage generator configured to provide a variable voltage signal based on a real time voltage converted digital signal, a startup voltage converted digital signal and a duty cycle converted digital signal;

wherein during the startup period of the switching mode power supply, the variable voltage signal is directly proportional to the duty cycle converted digital signal, while after the startup period of the switching mode power supply, the variable voltage signal is directly proportional to a ratio of the startup voltage converted digital signal to the real time voltage converted digital signal.

13. The switching mode power supply of claim 12, wherein the variable voltage generator comprises:

a compensation current source configured to provide a current inversely proportional to the real time voltage converted digital signal and directly proportional to the startup voltage converted digital signal; and a variable resistor coupled to the compensation current source to receive the current, wherein the variable resistor has a resistance proportional to the duty cycle converted digital signal;

wherein the current provided by the compensation current source flows through the variable resistor to generate the variable voltage signal.

14. The switching mode power supply of claim 12, wherein the variable voltage generator comprises:

a compensation current source configured to provide a current directly proportional to the duty cycle converted digital signal, and directly proportional to a ratio of the startup voltage converted digital signal to the real time voltage converted digital signal; and a constant resistor coupled to the compensation current source to receive the current;

wherein the current provided by the compensation current source flows through the constant resistor to generate the variable voltage signal.

15. A switching mode power supply comprising:

a switching circuit including an inductor, wherein the switching circuit is configured to convert an input voltage to an output voltage;

a current sense circuit having an input terminal and an output terminal, wherein the input terminal is coupled to the switching circuit to sense a current flowing through the inductor of the switching circuit, and based on the current flowing through the inductor, the current sense circuit generates a current sense signal at the output terminal;

a slope compensation circuit having an input terminal and an output terminal, wherein the input terminal is coupled to the current sense circuit to receive the current sense signal, and the slope compensation circuit performs a sum operation on a slope compensation signal and the current sense signal to generate a compensated current sense signal at the output terminal;

a reference signal generator configured to generate a reference signal, wherein the reference signal consists a constant voltage signal and a variable voltage signal which is directly proportional to a duty cycle of the switching mode power supply during the startup period of the switching mode power supply, and is directly proportional to the ratio of the input voltage at the end of the startup period to the real time input voltage after the startup period of the switching mode power supply;

a comparison circuit having a first input terminal, a second input terminal and an output terminal, wherein the first input terminal is coupled to the slope compensation circuit to receive the compensated current sense signal, the second input terminal is coupled to the reference signal generator to receive the reference signal, and based on the compensated current sense signal and the reference signal, the comparison circuit generates a comparison result at the output terminal; and a logic control circuit having an input terminal and an output terminal, wherein the input terminal is coupled to the comparison circuit to receive the comparison result, and based on the comparison result, the logic control circuit provides a control signal at the output terminal;

wherein the switching circuit receives the control signal provided by the logic control circuit, and works under the control of the control signal.

16. The switching mode power supply of claim 15, wherein the reference signal generator comprises:

a constant voltage generator configured to provide a constant voltage signal; and a variable voltage generator configured to provide a variable voltage signal based on a real time voltage converted digital signal, a startup voltage converted digital signal and a duty cycle converted digital signal;

wherein during the startup period of the switching mode power supply, the variable voltage signal is directly proportional to the duty cycle converted digital signal, while after the startup period of the switching mode power supply, the variable voltage signal is directly proportional to a ratio of the startup voltage converted digital signal to the real time voltage converted digital signal.

17. The switching mode power supply of claim 16, wherein the variable voltage generator comprises:
   a compensation current source configured to provide a current inversely proportional to the real time voltage converted digital signal and directly proportional to the startup voltage converted digital signal; and
   a variable resistor coupled to the compensation current source to receive the current, wherein the variable resistor has a resistance proportional to the duty cycle converted digital signal;
      wherein the current provided by the compensation current source flows through the variable resistor to generate the variable voltage signal.

18. The switching mode power supply of claim 16, wherein the variable voltage generator comprises:
   a compensation current source configured to provide a current directly proportional to the duty cycle converted digital signal, and directly proportional to a ratio of the startup voltage converted digital signal to the real time voltage converted digital signal; and
   a constant resistor coupled to the compensation current source to receive the current;
      wherein the current provided by the compensation current source flows through the constant resistor to generate the variable voltage signal.

19. A method of generating a reference signal used with a switching mode power supply, comprising:
   converting an input voltage of the switching mode power supply to a real time voltage converted digital signal;
   generating a startup voltage converted digital signal based on the real time voltage converted digital signal, wherein the startup voltage converted digital signal remains the value at an end of a startup period unchanged after the startup period of the switching mode power supply;
   converting a duty cycle signal to a duty cycle converted digital signal; and
   generating the reference signal based on the real time voltage converted digital signal, the startup voltage converted digital signal and the duty cycle converted digital signal;
      wherein during the startup period of the switching mode power supply, the reference signal is directly proportional to the duty cycle of the switching mode power supply, and after the startup period of the switching mode power supply, the reference signal is directly proportional to the ratio of the input voltage at the end of the startup period to the input voltage of real time.

20. The method of claim 19, wherein generating the reference signal based on the real time voltage converted digital signal, the startup voltage converted digital signal and the duty cycle converted digital signal comprising:
   applying a constant current to a constant resistor to generate a constant voltage signal;
   applying a variable current to a variable resistor to generate a variable voltage signal;
   performing a sum operation on the constant voltage signal and the variable voltage signal to generate the reference signal;
   adjusting the variable current according to the real time voltage converted digital signal and the startup voltage converted digital signal; and
   adjusting the resistance of the variable resistor according to the duty cycle converted digital signal.

21. The method of claim 19, wherein generating the reference signal based on the real time voltage converted digital signal, the startup voltage converted digital signal and the duty cycle converted digital signal comprising:
   applying a constant current to a first constant resistor to generate a constant voltage signal;
   applying a variable current to a second constant resistor to generate a variable voltage signal;
   performing a sum operation on the constant voltage signal and the variable voltage signal to generate the reference signal; and
   adjusting the variable current according to the real time voltage converted digital signal, the startup voltage converted digital signal and the duty cycle converted digital signal.

* * * * *